US012706402B2

(12) United States Patent
Stein et al.

(10) Patent No.: US 12,706,402 B2
(45) Date of Patent: Aug. 11, 2026

(54) AUTOMATION MODULE WITH AN ADAPTER

(71) Applicant: Siemens Aktiengesellschaft, Munich (DE)

(72) Inventors: Ulf Stein, Schwandorf (DE); Alexander Schmidt, Wiesbaden (DE); Martin Bergmann, Schnaittenbach (DE)

(73) Assignee: Siemens Aktiengesellschaft, Munich (DE)

( * ) Notice: Subject to any disclaimer, the term of this patent is extended or adjusted under 35 U.S.C. 154(b) by 293 days.

(21) Appl. No.: 18/511,341

(22) Filed: Nov. 16, 2023

(65) Prior Publication Data

US 2024/0170872 A1 May 23, 2024

(30) Foreign Application Priority Data

Nov. 21, 2022 (EP) .................................... 22208536

(51) Int. Cl.
*H01R 12/71* (2011.01)
*H01R 13/10* (2006.01)
*H01R 13/514* (2006.01)
*H01R 31/06* (2006.01)

(52) U.S. Cl.
CPC .......... *H01R 12/716* (2013.01); *H01R 13/10* (2013.01); *H01R 13/514* (2013.01); *H01R 31/06* (2013.01)

(58) Field of Classification Search
CPC .... H01R 12/716; H01R 13/10; H01R 13/514; H01R 31/06
USPC .......................................................... 439/660
See application file for complete search history.

(56) References Cited

U.S. PATENT DOCUMENTS 6,383,031 B1 * 5/2002 Law ..................... H01R 9/0515 439/680
6,632,107 B1 * 10/2003 Vanbesien ............ H01R 13/645 439/78
9,478,913 B2 * 10/2016 Bräunlich ............ H05K 7/1474
2013/0196552 A1 8/2013 Donhauser et al.
2013/0271951 A1 10/2013 Ringer
(Continued)

FOREIGN PATENT DOCUMENTS

EP 2624378 8/2013
EP 2654317 10/2013
EP 2683227 1/2014
(Continued)

*Primary Examiner* — Tulsidas C Patel
(74) *Attorney, Agent, or Firm* — Cozen O'Connor

(57) ABSTRACT

An automation module includes a housing that has a front and rear sides, top and lower sides and a left and right sides, wherein a printed circuit board is arranged within the housing parallel between the left and right sides of the housing, the lower and top sides are formed at least as a ventilation grid to enable cooling inside the housing, where a first plug connector is arranged on the printed circuit board proximate to the top side, an adapter is detachably arranged on the top side, where the adapter has a second plug connector and forms an encoding element such that the adapter includes pins arranged such that, during an insertion-withdrawal operation of the second plug connector into the first plug connector, the pins pass through openings in the ventilation grid and an insertion-withdrawal operation of the second plug connector into the first plug connector is therefore possible.

16 Claims, 3 Drawing Sheets

(56) References Cited

U.S. PATENT DOCUMENTS

2014/0011386 A1 1/2014 Braeunlich et al.

FOREIGN PATENT DOCUMENTS

EP 2728984 5/2014
EP 2906030 B1 9/2018
EP 3582596 12/2019

* cited by examiner

AUTOMATION MODULE WITH AN ADAPTER

BACKGROUND OF THE INVENTION

1. Field of the Invention

The invention relates to an automation module with a housing which has a rear side, a front side, a lower side, a top side, a left side and a right side, where a first printed circuit board is arranged within the housing in parallel between the left and right sides of the housing, and where the lower and top sides are formed at least partially as a ventilation grid to enable convection cooling in the interior of the housing.

2. Description of the Related Art

The following patent specifications or patent applications already disclose automation components with housings and ventilation grids, where EP 2 906 030 B1 discloses an electronic module with an electrically conductive connection, EP 2 624 378 B1 discloses an input/output module from industrial automation technology, EP 2 654 317 B1 discloses an input/output module with a display element, EP 2 683 227 B1 discloses an electronic module for insertion into a carrier unit, and where EP 2 728 984 A1 discloses a housing with a first housing part and a second housing part with a swivel pin.

SUMMARY OF THE INVENTION

It is the object of the present invention to provide a maintenance and diagnostics interface that is available to conventional automation modules without changing the outer appearance of the module.

This and other objects and advantages are achieved in accordance with the invention in which a first plug connector is arranged on the first printed circuit board of automation module in the immediate vicinity of the top side, an adapter is detachably arranged on the top side, where the adapter has a second plug connector and is formed as an encoding element such that the adapter includes pins that are arranged such that during an insertion-withdrawal operation of the second plug connector in the first plug connector they pass through openings in the ventilation grid and an insertion-withdrawal operation of the second plug connector into the first plug connector is therefore possible.

The adapter that is now available for the module has domes and pins which, in addition to the encoding, also assumes a guidance function upon insertion into the automation module. Furthermore, the domes and pins form a protection for the contacts of the plug connectors. For an arrangement of the domes and pins, there are a variety of possibilities for configuring the adapter depending on the function with respect to an associated automation device. With a different arrangement of the domes and pins, insertion into the automation module is permitted or blocked. Automation modules can be controllers, CPUs, communication modules, input/output modules, control modules, failsafe modules (F-modules), which are generally all configured for an installable modular station design, in particular for a decentralized design.

The first plug connector is advantageously formed on the first printed circuit board as a maintenance and diagnostics interface. This interface is attached to the device in a concealed manner and is thus protected against unwanted access. Advantageously, with the knowledge that an interface is located below the ventilation grid, the ability to reach a maintenance and diagnostic interface is now fulfilled, e.g., for a debug function. Particularly with respect to safety-related systems, this interface is located in a concealed manner within the device.

With safety-relevant automation modules, the first plug connector is connected to parts of the module that are provided for a safety-relevant operation and the adapter with the encoding element forms a safety-relevant encoding which finally permits access to relevant operating elements by contacting the two plug connectors or does not permit access by preventing the two plug connectors from making contact. This is advantageous because modules that are established in F-technology can only be coupled for specific assemblies via the diagnostics interface.

The first plug connector is further formed as a socket and the second plug connector is formed with contact elements that project from both sides.

In order to realize special functions that can be programmed from the outside, at least one detachable contact bridge is arranged in the second plug connector and the module is configured to identify an inserted contact bridge. These contact bridges are formed as "jumper contact bridges" and can electrically connect/bridge two contacts.

With the adapter, the pins are also configured to fit exactly into the available ventilation grid on account of their molding. This ensures a protection against turning and the correct position. The pins are configured such that, on account of their length in combination with a counterpart, the adapter either fits or is blocked in the interior of the housing.

In a further embodiment, the adapter has a collar around the second plug connector with the projecting contact elements and the collar is formed with a cutout for an encoding with a counterpart.

In order to easily differentiate the corresponding adapter obviously and instantly, a color differentiation, a labeling or another, easily recognizable indicator would be possible. To this end, the adapter has a light source as an identifiable indicator, which makes a system operator aware that the adapter is inserted.

For a modular construction technology, with the automation module the rear side is configured for a detachable assembly on a module carrier.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The drawing shows an exemplary embodiment of the invention, in which.

DETAILED DESCRIPTION OF THE EXEMPLARY EMBODIMENTS

It should be understood that independent of the grammatical term or usage, individuals with male, female or other gender identities are included within the term.

Figure 1:
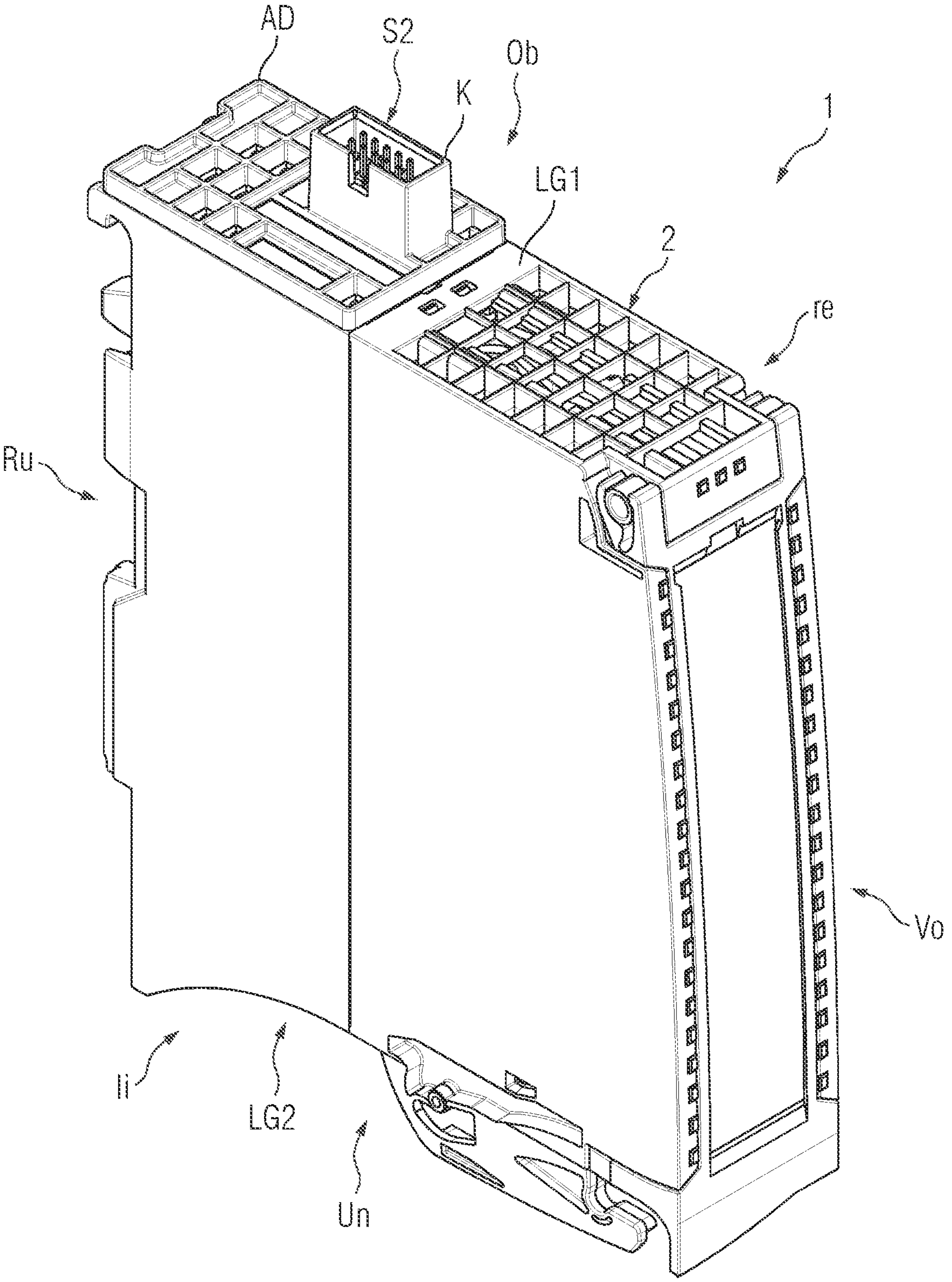
FIG. 1 shows a three dimensional view of an automation module in accordance with the invention.

FIG. 1 shows an automation module 1 with a housing 2. The housing 2 has a rear side Ru, a front side Vo, a lower side Un, a top side Ob, a left side li and a right side re. Within the housing 2, a first printed circuit board LP1 is arranged in parallel between the left side li and the right side re of the housing 2. The lower side Un and the top side Ob are formed at least partially as a first ventilation grid LG1 and a second ventilation grid LG2, in order to enable convection cooling within the interior of the housing 2.

A first plug connector S1 is arranged on the first printed circuit board LP1 (see FIG. 3) in the immediate vicinity of or proximate to the top side Ob. An adapter AD is detachably arranged on the top side Ob. The adapter AD has a second plug connector S2, and is formed as an encoding element such that the adapter AD has pins Z1, . . . , Z15. These pins Z1, . . . , Z15 are arranged such that with an insertion-withdrawal operation of the second plug connector S2 into the first plug connector S1 they pass through openings in the ventilation grid through openings in the first ventilation grid LG1, and an insertion-withdrawal operation of the second plug connector S2 into the first plug connector S1 is thus possible.

Figure 2:
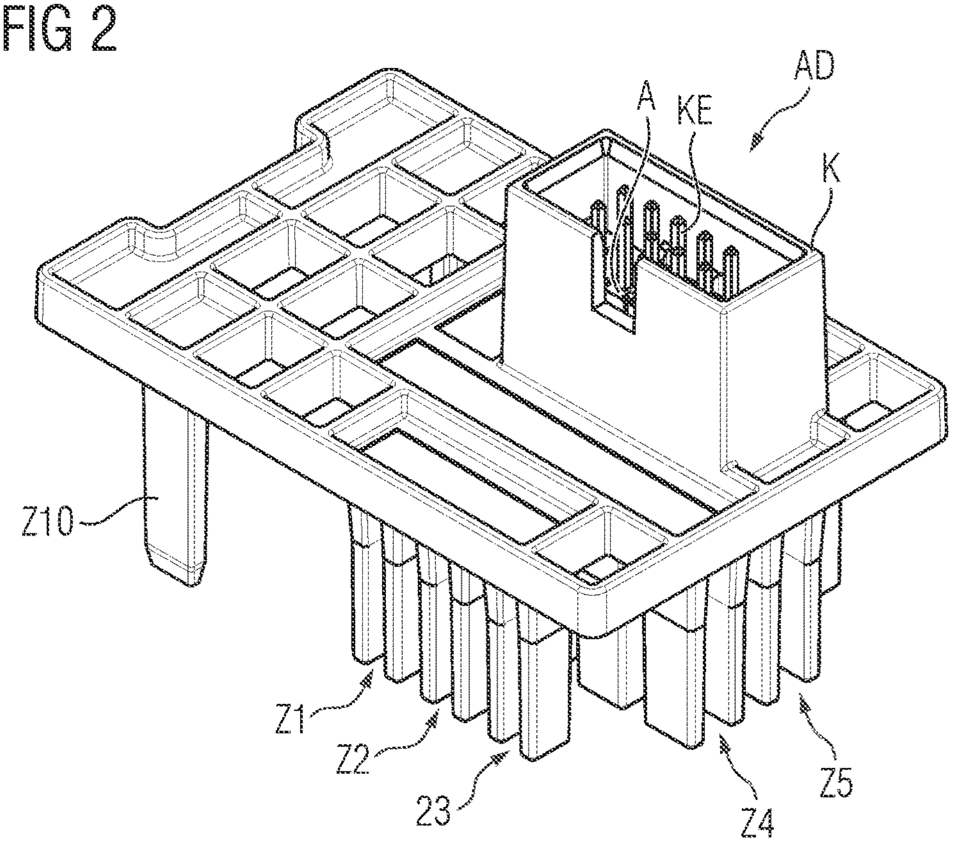
FIG. 2 shows an adapter in accordance with the invention.

FIG. 2 shows the adapter AD in a three-dimensional view about the second plug connector S2, where a collar K is arranged with a recess A. The pins Z1, . . . , Z15 are located on a lower side Un of the adapter AD counted contrary to the clockwise direction.

Figure 3:
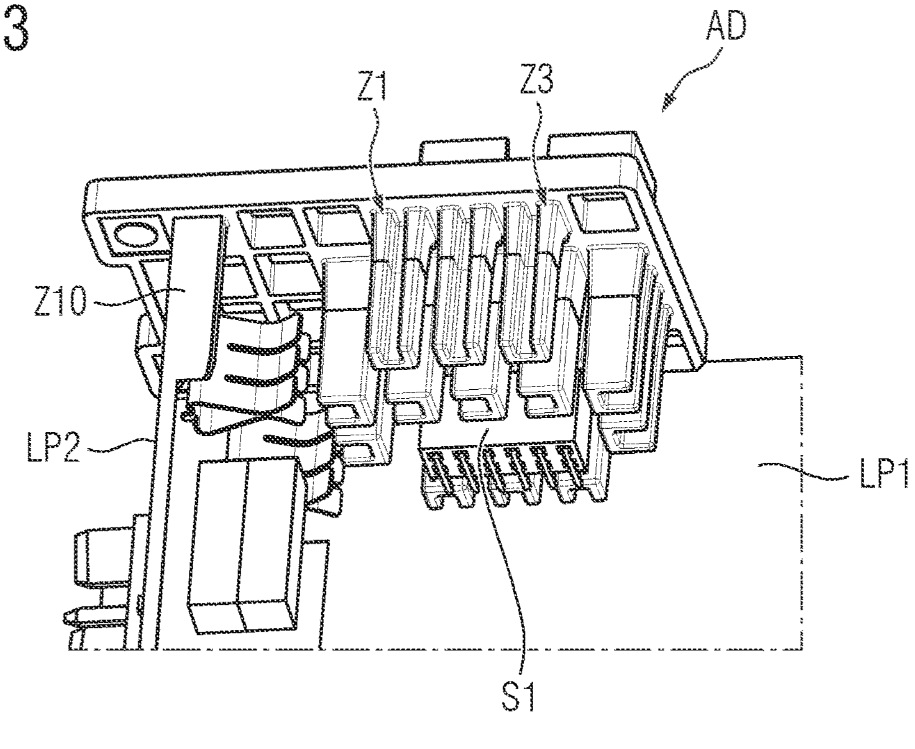
FIG. 3 shows a sectional representation of the automation module with a view onto the adapter and the first printed circuit board in accordance with the invention.

FIG. 3 shows the adapter AD, as it rests in the inserted state with the first plug connector on the first printed circuit board LP1. A tenth pin Z10 and a ninth pin Z9 are configured such that, on account of their length in combination with a counterpart, i.e., a second printed circuit board LP2 in the interior of the housing 2, the adapter AD is blocked at a corresponding depth.

Figure 4:
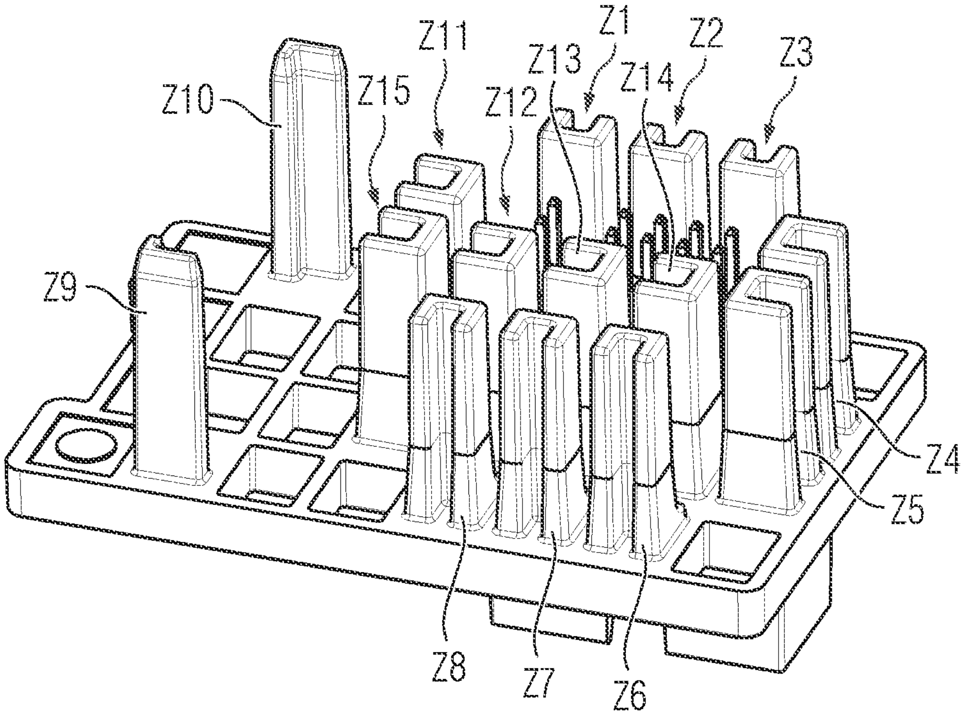
FIG. 4 shows a rotated view of the adapter of FIG. 2.

FIG. 4 shows the adapter described with respect to FIG. 2 with a view onto the pins Z1, . . . , Z15.

Figure 5:
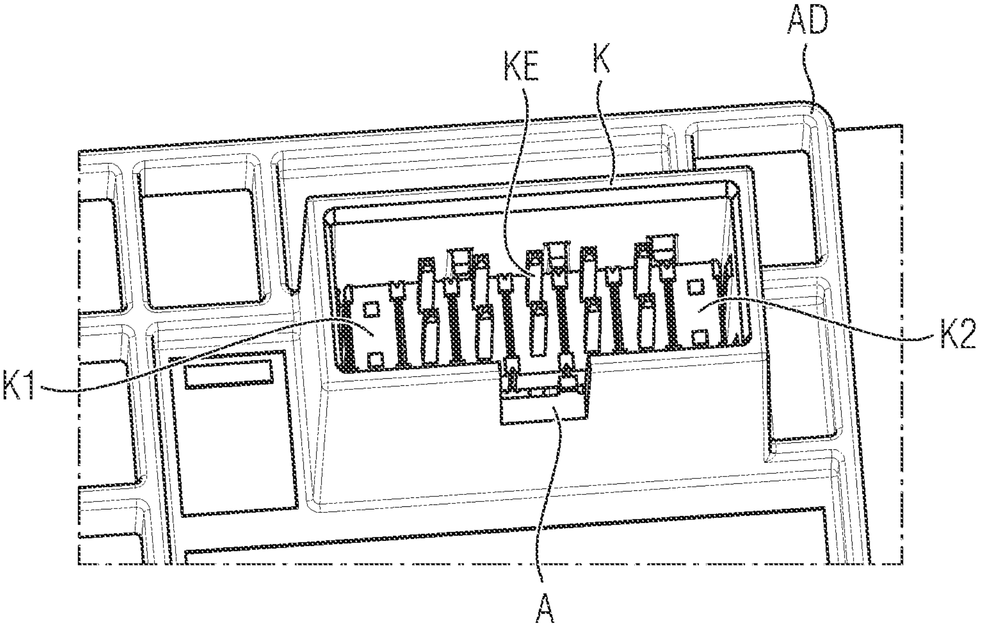
FIG. 5 shows a detailed representation of the adapter with a view onto a collar around a plug connector in accordance with the invention.

FIG. 5 shows a detailed view of the adapter AD, with a focus on the collar K. The second plug connector S2 shows the contact elements KE as they project outward. A first contact bridge K1 is arranged to the left of the second plug connector S2 and a second contact bridge K2 is arranged to the right of the second plug connector S2. The module is configured here such that it can identify an inserted contact bridge K1, K2 in the second plug connector S2 and can evaluate the same for special functions.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements that perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. An automation module having a housing, which has a rear side, a front side, a lower side, a top side, a left side and a right side, the automation module comprising:

a first printed circuit board arranged in the housing in parallel between the left side and the right side of the housing, the lower side and the top side being formed at least partially as a ventilation grid to enable convection cooling in an interior of the housing;

a first plug connector arranged on the first printed circuit board in an immediate vicinity of the top side; and an adapter detachably arranged on the top side, the adapter including a second plug connector and forming an encoding element such that the adapter includes pins which are arranged such that during an insertion-withdrawal operation of the second plug connector into the first plug connector said pins pass through openings in the housing and an insertion-withdrawal operation of the second plug connector into the first plug connector becomes possible.

2. The automation module as claimed in claim 1, wherein the first plug connector is formed on the first printed circuit board as a maintenance and diagnostics interface.

3. The automation module as claimed in claim 2, wherein the first plug connector is connected to parts of the module which are provided for a safety-relevant use and the adapter forms the encoding element to provide a safety-relevant encoding which provides access to relevant operating structure by contacting both plug connectors.

4. The automation module as claimed in claim 3, wherein the adapter includes a collar disposed about the second plug connector with the projecting contact elements, and the collar includes a cutout provided for an encoding with a counterpart.

5. The automation module as claimed in claim 2, wherein the first plug connector is configured as a socket and the second plug connector includes contact elements which project toward both sides.

6. The automation module as claimed in claim 1, wherein the first plug connector is connected to parts of the module which are provided for a safety-relevant use and the adapter forms the encoding element to provide a safety-relevant encoding which provides access to relevant operating structure by contacting both plug connectors.

7. The automation module as claimed in claim 6, wherein the first plug connector is configured as a socket and the second plug connector includes contact elements which project toward both sides.

8. The automation module as claimed in claim 1, wherein the first plug connector is configured as a socket and the second plug connector includes contact elements which project toward both sides.

9. The automation module as claimed in claim 1, wherein at least one detachable contact bridge is arranged in the second plug connector and the automation module is configured to identify an inserted contact bridge.

10. The automation module as claimed in claim 9, wherein the adapter includes a collar disposed about the second plug connector with the projecting contact elements, and the collar includes a cutout provided for an encoding with a counterpart.

11. The automation module as claimed in claim 1, wherein the pins are configured to fit into the available ventilation grid.

12. The automation module as claimed in claim 11, wherein the adapter includes a collar disposed about the second plug connector with the projecting contact elements, and the collar includes a cutout provided for an encoding with a counterpart.

13. The automation module as claimed in claim 1, wherein the pins are configured such that the adapter fits or is blocked in the interior of the housing based on a length of the pins.

14. The automation module as claimed in claim 13, wherein the adapter includes a collar disposed about the second plug connector with the projecting contact elements, and the collar includes a cutout provided for an encoding with a counterpart.

15. The automation module as claimed in claim 1, wherein the adapter includes a light source which indicates to a system operator the adapter is inserted.

16. The automation module as claimed in claim 1, wherein the rear side is configured for detachable attachment to a module carrier.

* * * * *